(12) United States Patent
Connolly (10) Patent No.: US 11,019,513 B2
(45) Date of Patent: May 25, 2021

(54) MEASURING DEVICE AND MEASURING METHOD FOR LOW-ATTENUATION MEASURING ENVIRONMENTS

(71) Applicant: Rohde & Schwarz GmbH & Co. KG, Munich (DE)

(72) Inventor: David Connolly, Portland, OR (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 140 days.

(21) Appl. No.: 16/045,337

(22) Filed: Jul. 25, 2018

(65) Prior Publication Data
US 2020/0037182 A1 Jan. 30, 2020

(51) Int. Cl.
*H04W 24/08* (2009.01)
*H04L 12/24* (2006.01)
*H04W 16/18* (2009.01)

(52) U.S. Cl.
CPC ......... *H04W 24/08* (2013.01); *H04L 41/5038* (2013.01); *H04W 16/18* (2013.01)

(58) Field of Classification Search
CPC .... H04W 24/08; H04W 16/18; H04L 41/5038
See application file for complete search history.

(56) References Cited

U.S. PATENT DOCUMENTS

| | | | |
|---|---|---|---|
| 2002/0160802 A1* | 10/2002 | Hiramatsu | H04W 52/24 455/522 |
| 2002/0196758 A1* | 12/2002 | Shoji | H04W 72/12 370/337 |
| 2007/0086349 A1 | 4/2007 | Liu | |
| 2007/0238417 A1* | 10/2007 | Bennett | H04W 52/24 455/69 |
| 2008/0031144 A1* | 2/2008 | Kawamoto | H04W 24/06 370/242 |
| 2008/0287117 A1* | 11/2008 | Olgaard | H04B 17/0085 455/423 |
| 2010/0075664 A1* | 3/2010 | Maucksch | H04W 24/06 455/425 |
| 2011/0250847 A1* | 10/2011 | Pauly | H04W 24/06 455/67.11 |
| 2012/0282970 A1* | 11/2012 | Kela | H04W 52/248 455/522 |
| 2013/0084872 A1* | 4/2013 | Suga | H04W 36/0061 455/437 |
| 2014/0341052 A1* | 11/2014 | Devarasetty | H04W 24/08 370/252 |

(Continued)

*Primary Examiner* — Jeffrey M Rutkowski
*Assistant Examiner* — Jasper Kwoh
(74) *Attorney, Agent, or Firm* — Ditthavong, Steiner & Mlotkowski (57) ABSTRACT

A measuring device for performing measurements on a device under test is provided. It comprises a transmitter, which is adapted to transmit a first message to the device under test with a first transmission power. The first message comprises a first transmission power parameter and an expected reception power parameter. The measuring device moreover comprises a parameter generator, which is adapted to generate the first transmission power parameter larger than the first transmission power by an error value. The parameter generator is moreover adapted to generate the expected reception power parameter lower than an expected reception power of the measuring device, by the error value.

15 Claims, 4 Drawing Sheets

(56) References Cited

U.S. PATENT DOCUMENTS

2016/0233970 A1\* 8/2016 Reed .................. H04B 17/29
2016/0359717 A1\* 12/2016 Sheya ................ H04L 43/50
2020/0112347 A1\* 4/2020 Fukui ............... H04W 52/0254

\* cited by examiner

MEASURING DEVICE AND MEASURING METHOD FOR LOW-ATTENUATION MEASURING ENVIRONMENTS

TECHNICAL FIELD

The invention relates to performing measurements on a mobile communications device in a low-attenuation measuring environment. Especially, the invention relates to performing measurements on Wi-Fi devices according to the 802.11ax standard.

BACKGROUND ART

For performing measurements on mobile communications devices, over-the-air measurements can be used. This means that the measuring device transmits to the mobile device over the air and/or receives messages from the device under test over the air. Since measuring chambers have a limited size, performing such over-the-air measurements usually cannot simulate real-world measuring conditions, especially real-world levels of channel loss. An option is to artificially attenuate the signals, but this results in a high hardware effort for performing the measurements.

Alternatively, instead of an over-the-air measurement, a measurement through a wired connection between the measuring device and the device under test can be used. Also, in this case, such a wired connection is far from real-world transmission conditions. Especially, the channel loss is significantly lower than in a real-world environment.

Also, here, additional attenuators and further measures for simulating real-world transmission conditions can be employed. These though also significantly increase the hardware effort. For example, the document US 2007/0086349 A1 shows such an approach.

Accordingly, there is a need to provide a measuring device and a measuring method, which allow for performing accurate measurements on a device under test without requiring a complex hardware setup.

SUMMARY OF THE INVENTION

According to a first aspect of the invention, a measuring device for performing measurements on a device under test is provided. The measuring device comprises a transmitter, which is adapted to transmit a first message to the device under test with a first transmission power. The first message therein comprises a first transmission power parameter and an expected reception power parameter. The measuring device moreover comprises a parameter generator, which is adapted to generate the first transmission power parameter larger than the first transmission power by an error value. The parameter generator is moreover alternatively or additionally adapted to generate the expected reception power parameter lower than an expected reception power of the measuring device, by the error value. This allows for the device under test to receive the first message at a power level comparable to a real-world reception power, while at the same time forcing it to transmit at such a low power that the measuring device can receive a response message and accurately determine the device under test's behavior therefrom.

Advantageously and preferably, the parameter generator is adapted to automatically determine the error value. This allows for a very low necessary user experience for operating the measuring device.

Advantageously and preferably, the parameter generator is adapted to automatically determine the error value, so that the first transmission power parameter does not exceed a maximum first transmission power parameter and does not fall below a minimum first transmission power parameter.

Moreover, the parameter generator is preferably adapted to automatically determine the error values so that the expected reception power parameter does not exceed a maximum expected reception power parameter and does not fall below a minimum expected reception power parameter. This allows for a standard-conform testing of the device under test.

Further advantageously and preferably, the measuring device comprises a user interface, which is adapted to receive user input. This allows for a very flexible measurement.

The user interface is advantageously and preferably adapted to receive a user input regarding the error value. The parameter generator is then adapted to generate the first transmission power parameter and the expected reception power parameter based upon the error value received by the user interface. It is thereby possible to flexibly make settings by the user, while the measuring device automatically determines the respective parameters therefrom.

Further advantageously and preferably, the user interface is adapted to accept user input regarding the error value only in an allowable range of the error value. The allowable range of the error value is then defined by a maximum first transmission power parameter, a minimum first transmission power parameter, a maximum expected reception power parameter and a minimum expected reception power parameter. This further decreases the necessary amount of user experience for operating the measuring device.

Advantageously and preferably, the user interface is moreover adapted to receive user input regarding the first transmission power parameter and the expected reception power parameter. The parameter generator is then adapted to generate the first transmission power parameter and the expected reception power parameter based upon the parameters received by the user interface. This further increases the flexibility of the measurement.

Advantageously and preferably, the user interface is adapted to accept user input regarding the first transmission power parameter and the expected reception power parameter only in an allowable range of the first transmission power parameter and the expected reception power parameter. This even further reduces the amount of necessary user experience.

Advantageously and preferably, the measuring device comprises a receiver, adapted to receive a second message from the device under test, transmitted by the device under test with a second transmission power. This allows for checking the response of the device under test to the first message.

Advantageously and preferably, the receiver is adapted to determine a reception power of the second message. The measuring device is then adapted to compare the reception power of the second message with the expected reception power of the measuring device. This allows for automatically testing the performance of the device under test.

According to a second aspect of the invention, a measuring system is provided. The measuring system comprises a measuring device according to the first aspect of the invention and a device under test. This allows for performing a complete measurement without any external components.

Advantageously and preferably, the measuring device of the measuring system comprises a receiver, which is adapted to receive a second message from the device under test, which is transmitted by the device under test with a second transmission power. The receiver is moreover adapted to determine a reception power of the second message. The measuring device is adapted to compare the reception power of the second message with the expected reception power of the measuring device.

The device under test is moreover preferably adapted to receive the first message, determine a reception power of the first message, determine a channel loss by subtracting the determined reception power of the first message from the first transmission power parameter, wherein the determined channel loss is larger than an actual channel loss by the error value, determine a transmission power of the second message by adding the determined channel loss to the received expected reception power parameter, resulting in the error value cancelling out in the determined transmission power of the second message, and transmitting the second message to the measuring device with the second transmission power. This allows for a complete test of the device under test without any additional components.

According to a third aspect of the invention, a measuring method for performing measurements on a device under test using a measuring device is provided. The method comprises generating a first transmission power parameter larger by an error value than a first transmission power of a first message to the device under test and/or generating an expected reception power parameter lower by the error value than an expected reception power of the measuring device, and transmitting the first message to the device under test with the first transmission power, wherein the first message comprises the first transmission power parameter and the expected reception power parameter. This allows for the device under test to receive the first message at a power level comparable to a real-world reception power, while at the same time forcing it to transmit at such a low power that the measuring device can receive a response message and accurately determine the device under test's behavior therefrom.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
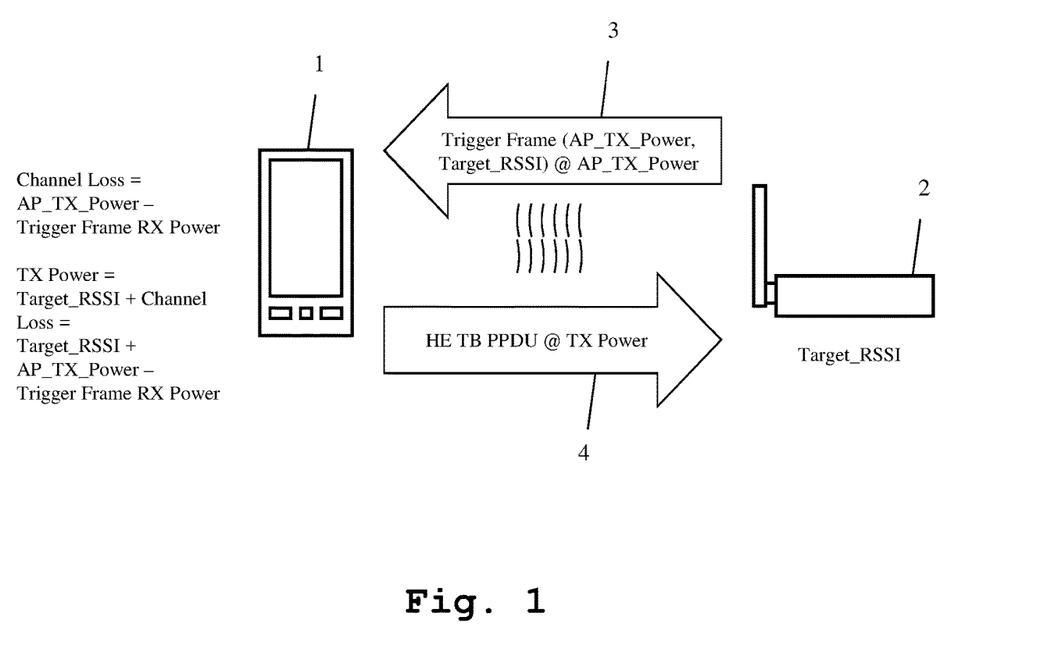
FIG. 1 shows an exemplary device under test in communications connection to an exemplary access point.

First, we demonstrate the general communication between a mobile station and an access point within a communications network along FIG. 1. There, also the underlying problem of the present invention is shown. With regard to FIG. 2 and FIG. 3, the construction and function of different embodiments of the inventive measuring device and system according to the first and second aspect of the invention are shown. Finally, with regard to FIG. 4, the function of an embodiment of the inventive measuring method according to the third aspect is described in detail.

Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

In FIG. 1, a communication between a mobile communications device 1 and an access point 2 is shown. Here, a communication according to the 802.11ax Wi-Fi standard is shown. The access point 2 transmits a first message 3, especially a trigger frame to the mobile device 1. This first message 3 comprises a first transmission power parameter, especially the AP_TX_Power parameter. Moreover, the first message 3 comprises an expected reception power parameter, especially the Target_RSSI parameter. The first transmission power parameter corresponds to the transmission power, with which the access point 2 transmits the first message 3 to the mobile device 1. The expected reception power parameter corresponds to a power level, at which the access point 2 wishes to receive answer messages from the mobile device 1.

The mobile device 1 receives the first message at a reception power, also referred to as trigger frame RX power. The mobile device 1 determines a channel loss by subtracting the reception power of the first message 3 from the first transmission power parameter comprised by the first message 3. After determining the channel loss, the mobile device 1 determines a transmission power of a second message 4, which is to be transmitted to the access point 2. The transmission power of the second message is determined by adding the determined channel loss to the expected reception power parameter, received with the first message 3. Then, the mobile device 1 transmits the second message 4 at the determined transmission power. The access point 2 then receives this message. Since the second message 4 is transmitted through the same channel as the first message 3, the channel loss is expected to be almost stationary, resulting in the access point 2 receiving the second message 4 at a reception power close to the transmitted expected reception power parameter.

First Embodiment

Figure 2:
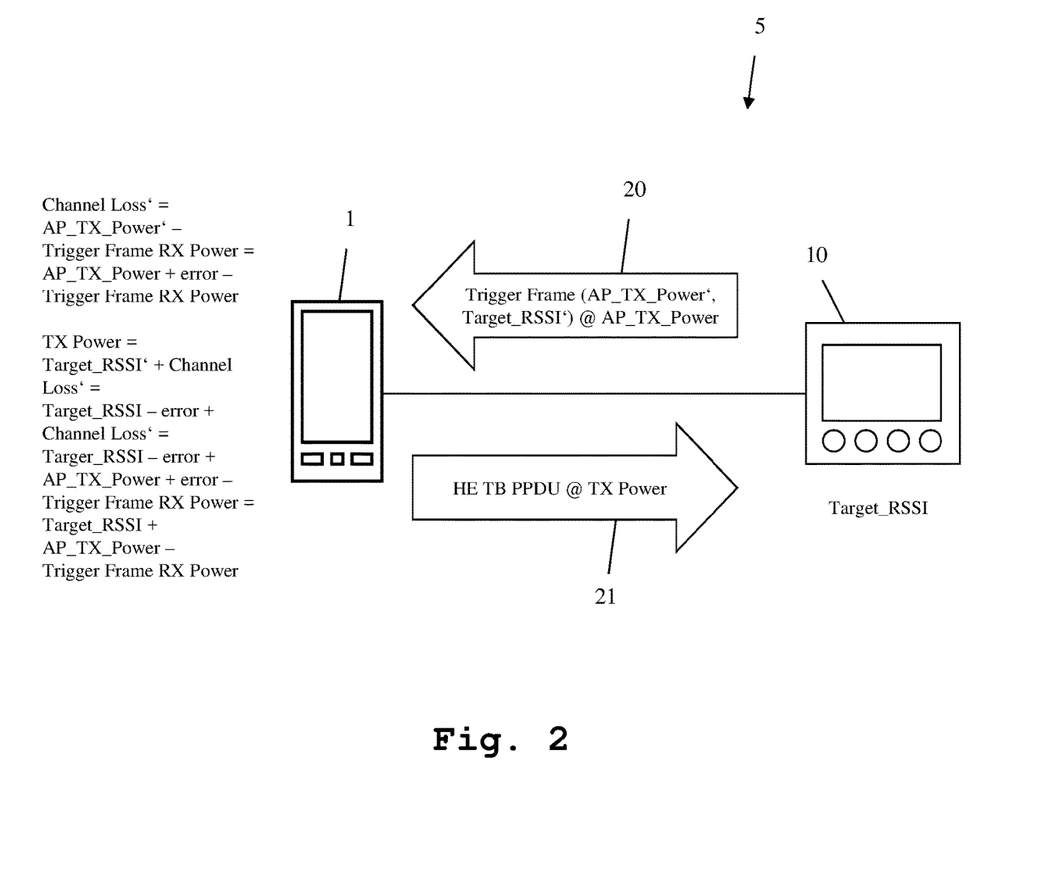
FIG. 2 shows a first embodiment of the inventive measuring device according to the first aspect of the invention and the inventive measuring system according to the second aspect of the invention.

In FIG. 2, a first embodiment of the measuring device 10 according to the first aspect of the invention and a measuring systems according to the second aspect of the invention is shown. Here, instead of the access point 2 of FIG. 1, a measuring device 10 is connected to the device under test 1. Especially, here a cable connection is used.

As explained earlier, in such a measuring setup, especially the channel loss is significantly lower than in a real-world environment. A problem when performing the measurement is that the first transmission power parameter transmitted with the first message 20, which corresponds to the first message 3 of FIG. 1 is limited by a maximum value and a minimum value. The maximum value is in the following also referred to as maximum first transmission power parameter, while the minimum value is in the following also referred to as minimum first transmission power parameter.

In practice, the first transmission power parameter is limited to a range of −20 dBm to +40 dBm. The same is true for the expected reception power parameter. It is limited by a minimum expected reception power parameter and a maximum expected reception power parameter. The range for the expected reception power parameter lies for example between −110 dBm to −20 dBm. These are the values according to the 802.11ax Wi-Fi standard for the AP_TX_Power parameter and the Target_RSSI parameter. A typical attenuation in a shielded measuring chamber environment with an over-the-air connection is around −10 dBm, while an attenuation of around +10 dBm is realistic for a cable connection, as shown in FIG. 2. Therefore, it is not possible to report a correct first transmission power parameter and expected reception power parameter without using additional attenuators, which would result in significant additional hardware effort.

The solution according to the first aspect of the invention—the measuring device 10—and according to the second aspect of the invention—the measuring system 5 comprising the measuring device 10 and the device under test 1, is to transmit an incorrect first transmission power parameter and an incorrect reception power parameter as part of the first message 20 to the device under test 1. Especially, the first transmission power parameter is achieved by adding an error value to the first transmission power.

$$AP\_TX\text{-}Power' = AP\_TX\_Power + error$$

At the same time, the expected reception power parameter is achieved by subtracting the same error value from the expected reception power of the measuring device 10.

$$Target\_RSSI' = Target\_RSSI - error$$

It is thereby achieved that the first transmission power parameter as well as the expected reception power parameter lie within the ranges defined by the respective communications standard.

The device under test 1 now receives the first message 20, which also here is a trigger frame according to the 802.11ax Wi-Fi standard and determines the channel loss by subtracting the reception power of the first message from the first transmission power parameter transmitted within the first message 20.

$$Channel\ Loss' = AP\_TX\_Power' - Trigger\ Frame\ RX\ Power = AP\_TX\_Power + error - Trigger\ Frame\ RX\ Power$$

Therefrom, the transmission power of the second message 21, which conforms to a HE TB PPDU according to the 802.11ax Wi-Fi standard is determined. Especially, the transmission power is determined as the expected reception power parameter in addition to the determined channel loss.

$$TX\ Power = Target\ RSSI' + Channel\ Loss' = Target\_RSSI - error + Channel\ Loss' = Target\_RSSI - error + AP\_TX\_Power + error - Trigger\ Frame\ RX\ Power = Target\_RSSI + AP\_TX\_Power - Trigger\ Frame\ RX\ Power$$

As one can see, the error value, which has been introduced by the measuring device 10 into the first transmission power parameter, and the expected reception power parameter cancels out result in the transmission power of the second message 21 being determined correctly, just as in a real-world communications environment.

The measuring device 10 therefore receives the second message 21 at a reception power close to the expected reception power without the error value. By comparing the reception power of the second message 21 to the expected reception power Target_RSSI, the measuring device 10 can determine the ability of the device under test to correctly process the first transmission power parameter and the expected reception power parameter transmitted with the first message.

Second Embodiment

Figure 3:
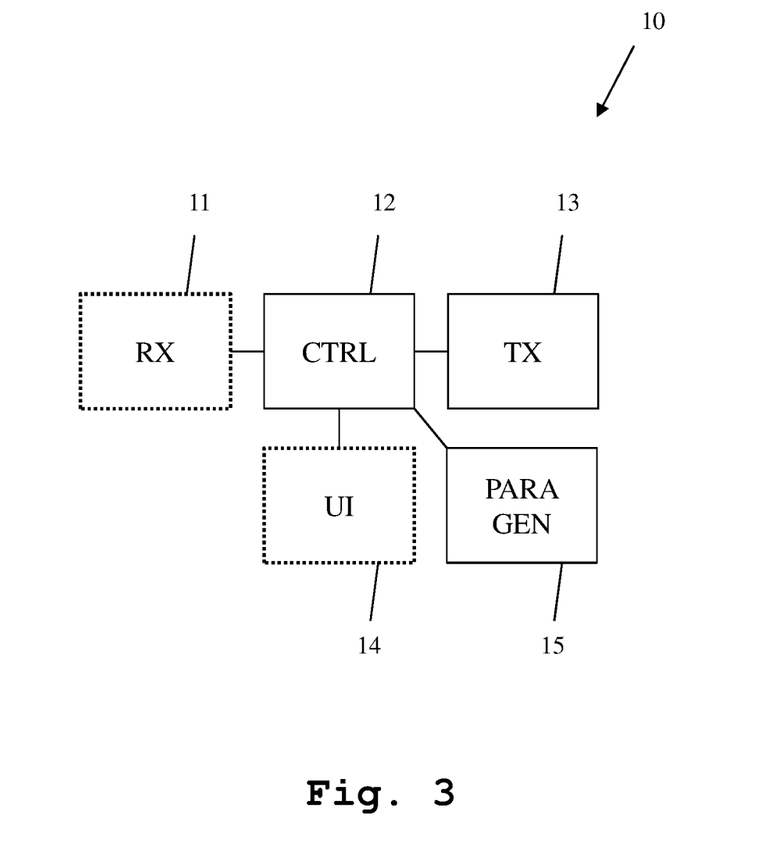
FIG. 3 shows a second embodiment of the inventive measuring device according to the first aspect of the invention.

In FIG. 3, a second embodiment of the measuring device according to the first aspect of the invention is shown. Here, the measuring device 10 comprises a receiver 11 connected to a controller 12, which again is connected to a transmitter 13. The controller 12 is moreover connected to a user interface 14 and to a parameter generator 15. The controller controls the function of all remaining units of the measuring device 10. The receiver 11 and the user interface 14 are only optional components.

When performing a measurement, the parameter generator 15 generates the first transmission power parameter and the expected reception power parameter as described above. Especially, the parameter generator 15 generates the first transmission power parameter larger by the error value than the first transmission power, which is later on used to transmit the first message. Moreover, the parameter generator 15 generates the expected reception power parameter lower by the error value than an expected reception power of the measuring device 10. These parameters are then used by the transmitter 13 to transmit the above-mentioned first message to the device under test.

Advantageously, the parameter generator 15 therein generates the error value automatically, especially so that the first transmission power parameter and/or the expected reception power parameter lie within the allowed ranges.

If the measuring device 10 comprises the user interface 14, the measuring device can receive user input through the user interface 14. Especially, the user can input error values and/or first transmission power parameter values and/or expected reception power parameter values. The transmitter then transmits the first message based upon the parameters entered by the user.

Advantageously, if the user does not enter all of the parameters manually, the parameter generator 15 generates the remaining parameters automatically. For example, if the user enters an error value, the parameter generator 15 generates a first transmission power parameter and an expected reception power parameter based thereupon.

Further advantageously, if the user enters a combination of values, which would lead to a non-standard-conform communication, the user interface 14 notifies the user and/or automatically corrects the values to reach a standard-conform communication.

Advantageously, the user interface 14 displays a suggested value for the first transmission power parameter, the expected reception power parameter and the error value. The user interface allows the user to change one or more of these parameters up or down, as long as they remain within the allowed ranges of the parameters.

Advantageously, if the user enters a value outside of the allowed ranges, the user interface notifies the user and/or automatically corrects the value to a value within the allowed ranges.

Moreover, if the measuring device 10 comprises the receiver 11, the measuring device 10 additionally receives the second message 21 of FIG. 2 from the device under test 1. The measuring device can then compare the received second message, especially the reception power of the second message 21 to the expected reception power of the measuring device 10, and thereby determine, if the device under test 1 properly processes the first transmission power parameter and the expected reception power parameter.

Third Embodiment

Figure 4:
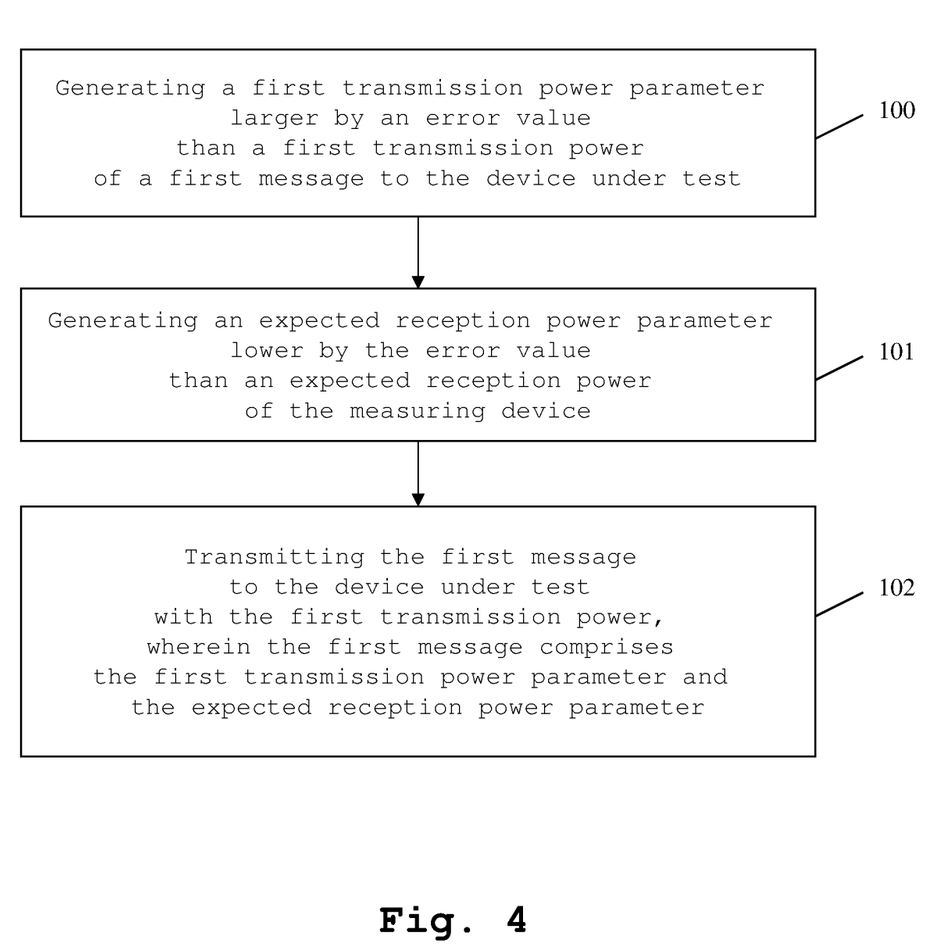
FIG. 4 shows an embodiment of the measuring method according to the third aspect of the invention in a flow diagram.

Furthermore, in FIG. 4, an embodiment of the third aspect of the invention is shown in a flow diagram. In a first step 100, a first transmission power parameter is generated, so that it is larger than a first transmission power of a first message to the device under test by an error value. In a second step 101 an expected reception power parameter is generated, so that it is lower by the same error value than an expected reception power of the measuring device. In a third step 102, the first message is transmitted to the device under test with the first transmission power, but comprising the first transmission power parameter and the expected reception power parameter.

It is important to note that the first message is transmitted at a different first transmission power than is reported in the first transmission power parameter.

The method according to the third aspect is very closely corresponding to the device and system of the first and second aspect. Therefore, it is referred to the above elaborations regarding the first and second aspect of the invention with regard to further details of the method according to the third aspect.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the communications standard 802.11ax. The invention discussed above can be applied to many communications standards. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A measuring device for performing measurements on a device under test according to a 802.11ax Wi-Fi standard, comprising:
   a transmitter, adapted to transmit a first message to the device under test with a first transmission power, wherein the first message comprises:
      a first transmission power parameter, which, according to the 802.11ax Wi-Fi standard indicates the first transmission power, and
      an expected reception power parameter, which, according to the 802.11ax Wi-Fi standard, indicates an expected reception power of the measuring device, and
   a parameter generator which:
      generates the first transmission power parameter deliberately incorrectly larger than the first transmission power by an error value, in violation of the 802.11ax Wi-Fi standard, and
      generates the expected reception power parameter deliberately incorrectly lower than the expected reception power of the measuring device, in violation of the 802.11ax Wi-Fi standard, by the error value.

2. The measuring device of claim 1, wherein the parameter generator is adapted to automatically determine the error value.

3. The measuring device of claim 1,
   wherein the parameter generator is adapted to automatically determine the error value, so that:
      the first transmission power parameter does not exceed a maximum first transmission power parameter, and/or
      the first transmission power parameter does not fall below a minimum first transmission power parameter.

4. The measuring device of claim 1, wherein the parameter generator is adapted to automatically determine the error value, so that:
   the expected reception power parameter does not exceed a maximum expected reception power parameter, and
   the expected reception power parameter does not fall below a minimum expected reception power parameter.

5. The measuring device of claim 1, wherein the measuring device comprises a user interface, adapted to receive user input.

6. The measuring device of claim 5,
   wherein the user interface is adapted to receive user input regarding the error value, and
   wherein the parameter generator is adapted to generate the first transmission power parameter and the expected reception power parameter based upon the error value received by the user interface.

7. The measuring device of claim 6, wherein the user interface is adapted to accept user input regarding the error value only in an allowable range of the error value.

8. The measuring device of claim 7, wherein the allowable range of the error value is defined by a maximum first transmission power parameter, a minimum first transmission power parameter, a maximum expected reception power parameter, and a minimum expected reception power parameter.

9. The measuring device of claim 5, wherein the user interface is adapted to receive user input regarding the first transmission power parameter and the expected reception power parameter.

10. The measuring device of claim 5, wherein the parameter generator is adapted to generate the first transmission power parameter and the expected reception power parameter based upon the first transmission power parameter and the expected reception power parameter received by the user interface.

11. The measuring device of claim 9, wherein the user interface is adapted to accept user input regarding the first transmission power parameter and the expected reception power parameter only in an allowable range of the first transmission power parameter and the expected reception power parameter.

12. The measuring device of claim 1, wherein the measuring device comprises a receiver, adapted to receive a second message from the device under test, transmitted by the device under test with a second transmission power.

13. The measuring device of claim 12,
wherein the receiver is adapted to determine a reception power of the second message, and/or
wherein the measuring device is adapted to compare the reception power of the second message with the expected reception power of the measuring device.

14. A measuring system comprising the measuring device according to claim 13 and a device under test,
wherein the device under test is adapted to:
receive the first message,
determine a reception power of the first message,
determine a channel loss by subtracting the determined reception power of the first message from the first transmission power parameter, wherein the determined channel loss is larger than an actual channel loss by the error value,
determine a transmission power of the second message by adding the determined channel loss to the received expected reception power parameter, resulting in the error value canceling out in the determined transmission power of the second message, and
transmit the second message to the measuring device with the second transmission power.

15. A measuring method for performing measurements on a device under test according to a 802.11ax Wi-Fi standard, using a measuring device, the method comprising:
transmitting, by way of a transmitter, a first message to the device under test with a first transmission power, wherein the first message comprises:
a first transmission power parameter, which, according to the 802.11ax Wi-Fi standard indicates the first transmission power, and
an expected reception power parameter, which, according to the 802.11ax Wi-Fi standard, indicates an expected reception power of the measuring device,
generating, by way of a parameter generator, the first transmission power parameter deliberately incorrectly larger than the first transmission power by an error value, in violation of the 802.11ax Wi-Fi standard, and
generating, by way of the parameter generator, the expected reception power parameter deliberately incorrectly lower than the expected reception power of the measuring device, in violation of the 802.11ax Wi-Fi standard, by the error value.

\* \* \* \* \*